US012711079B2

(12) United States Patent
Zhao et al.

(10) Patent No.: US 12,711,079 B2
(45) Date of Patent: Aug. 18, 2026

(54) DATA STORAGE METHOD AND SYSTEM, STORAGE ACCESS CONFIGURATION METHOD, AND RELATED DEVICE

(71) Applicant: Huawei Technologies Co., Ltd., Shenzhen (CN)

(72) Inventors: Yue Zhao, Shenzhen (CN); Wenlin Cui, Chengdu (CN); Siwei Luo, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 139 days.

(21) Appl. No.: 18/758,630

(22) Filed: Jun. 28, 2024

(65) Prior Publication Data

US 2024/0354267 A1 Oct. 24, 2024

Related U.S. Application Data

(63) Continuation of application No. PCT/CN2022/142297, filed on Dec. 27, 2022.

(30) Foreign Application Priority Data

Dec. 30, 2021 (CN) ........................ 202111662809.7

(51) Int. Cl.

| | |
|---|---|
| ***G06F 13/16*** | (2006.01) |
| ***G06F 13/42*** | (2006.01) |
| ***G06F 15/173*** | (2006.01) |

(52) U.S. Cl.
CPC ...... *G06F 13/1668* (2013.01); *G06F 13/4221* (2013.01); *G06F 15/17331* (2013.01)

(58) Field of Classification Search
CPC ............ G06F 13/1668; G06F 13/4221; G06F 15/17331; G06F 2212/154; G06F 2212/7201; G06F 2213/3808; G06F 3/061; G06F 3/067; G06F 9/50; G06F 9/5016; G06F 12/0868; G06F 13/12; G06F 3/06; G06F 12/1009; G06F 13/128;
(Continued)

(56) References Cited

U.S. PATENT DOCUMENTS 10,091,295 B1 * 10/2018 Savic ...................... G06F 16/25
10,255,213 B1 * 4/2019 Habusha ............... G06F 3/0679
(Continued)

FOREIGN PATENT DOCUMENTS

| | | |
|---|---|---|
| CN | 105518611 A | 4/2016 |
| CN | 107707628 A | 2/2018 |
| CN | 111212141 A | 5/2020 |

*Primary Examiner* — Farley Abad
(74) *Attorney, Agent, or Firm* — Conley Rose, P.C.

(57) ABSTRACT

A data storage system includes a host, an adapter card, and a storage node. The host establishes a communication connection to the adapter card through a bus, and the storage node establishes a communication connection to the adapter card through a network. The storage node is configured to store data that the host requests to write into a first memory space. The first memory space is a storage space that is provided by the adapter card for the host and that supports memory semantic access. The adapter card writes the data into a second memory space of the storage node, where the adapter card includes a first correspondence between a physical address of the second memory space and an address of the first memory space.

20 Claims, 6 Drawing Sheets

(58) Field of Classification Search
CPC ...... G06F 13/28; G06F 13/385; G06F 13/404; G06F 15/173; G06F 12/023; G06F 12/0877; G06F 13/382
See application file for complete search history.

(56) References Cited

U.S. PATENT DOCUMENTS

| | | | | |
|---|---|---|---|---|
| 2006/0155880 | A1* | 7/2006 | Elnozahy | H04L 49/358 710/1 |
| 2017/0132172 | A1 | 5/2017 | Romem et al. | |
| 2018/0032397 | A1* | 2/2018 | Silversides | G06F 11/1004 |
| 2018/0067893 | A1* | 3/2018 | Raindel | G06F 15/17331 |
| 2020/0201579 | A1 | 6/2020 | Zhou et al. | |
| 2021/0019069 | A1* | 1/2021 | Sen | G06F 12/122 |
| 2021/0064531 | A1 | 3/2021 | Bernat et al. | |
| 2021/0311646 | A1 | 10/2021 | Malladi et al. | |

* cited by examiner

DATA STORAGE METHOD AND SYSTEM, STORAGE ACCESS CONFIGURATION METHOD, AND RELATED DEVICE

CROSS-REFERENCE TO RELATED APPLICATIONS

This is a continuation of International Patent Application No. PCT/CN2022/142297 filed on Dec. 27, 2022, which claims priority to Chinese Patent Application No. 202111662809.7 filed on Dec. 30, 2021. The disclosures of the aforementioned applications are hereby incorporated by reference in their entireties.

TECHNICAL FIELD

This disclosure relates to the storage field, and in particular, to a data storage method and system, a storage access configuration method, and a related device.

BACKGROUND

Software structures of current storage systems may be classified into three levels: block-level, file-level, and object-level. An application server stores data in a memory into a persistent medium in a form of a file, an object, or a block.

During data persistence, storage systems with the three software structures each need to first write data into the memory, and then write the data in the memory into a hard disk for persistent storage. However, there is a difference between memory access and hard disk access (byte-level access and block-level access), and protocol conversion overheads are inevitable when the data in the memory enters a persistence layer. Consequently, the protocol conversion overheads consume system resources, and affect data persistence efficiency of the application server.

SUMMARY

This disclosure provides a data storage method and system, a storage access configuration method, and a related device, to resolve a problem of low data persistence efficiency caused by protocol conversion required for data persistence.

According to a first aspect, this disclosure provides a data storage method. The method is applied to a data storage system, and the data storage system includes a host, an adapter card, and a storage node. The host establishes a communication connection to the adapter card through a bus, and the storage node establishes a communication connection to the adapter card through a network. The method includes the following steps: the adapter card receives data that the host requests to write into a first address of a first memory space, where the first memory space is a storage space that is provided by the adapter card for the host and that supports memory semantic access; and the adapter card writes the data into a second memory space of the storage node, where the adapter card includes a first correspondence between a physical address of the second memory space and an address of the first memory space.

In a specific implementation, the second memory space is a non-volatile dual in-line memory module (NVDIMM). The bus includes one or more of a Peripheral Component Interconnect Express (PCIe) bus, a Computer Express Link (CXL) bus, and a generation Z (GenZ) bus. The adapter card may be inserted into a bus interface of the host 100 in a plug-in manner, for example, inserted into a Peripheral Component Interconnect (PCI) bus interface or a CXL bus interface, or may be printed on a mainboard together with another part, chip, or component of the host 100 during processing. This is not limited in this disclosure. Optionally, the adapter card may be a data processing unit (DPU), a network processor (NPU), a host bus adapter (HBA), or the like. This is not limited in this disclosure. The adapter card may also include a mainboard, which is also referred to as a printed circuit board (PCB). A chip is printed on the mainboard. The interface may include a frontend interface and a backend interface. The frontend interface is configured to communicate with the host, and the backend interface is configured to communicate with the storage node.

According to the method described in the first aspect, the adapter card may provide, for the host based on a size of a second memory space of the storage node, a first memory space that supports memory semantic access. When performing data persistence, the host writes data into the first memory space by using a memory semantic request. In response to the request, the adapter card persists the data to the second memory space of the storage node in a remote direct data access (remote direct memory access (RDMA)) manner. In this way, the host does not need to perform protocol conversion when performing data persistence, to improve access efficiency of the storage system.

In a possible implementation, the application in the host may load and unload the first memory space in a memory mapping manner. Memory mapping means that a physical address space of the first memory space is mapped to a virtual memory space of a process of the application, so that the process of the application may read and modify the first memory space. This improves processing efficiency of the application. In a specific implementation, the first memory space may be loaded by using a memory mapping function mmap, and the first memory space may be unloaded by deleting a mapping relationship by using a munmap function. Alternatively, another manner is used. This is not limited in this disclosure.

After performing memory mapping, the host may obtain a second correspondence between an address of the first memory space and a virtual memory address of the application. The second correspondence may be stored by using a page table. When requesting to write data into the first memory space, the host may first determine, based on the first virtual memory address that needs to be accessed by the application and the second correspondence recorded in the page table, the first address corresponding to the first virtual memory address, and then send a write request for the first address to the adapter card.

In the foregoing implementation, the host loads the first memory space in a memory mapping manner, so that the host can uniformly manage the first memory space and a local memory, and perform access by using memory semantics. In this way, in the storage system in this disclosure, consumption of protocol conversion for data persistence is avoided, and system deployment does not affect use of the local memory of the host, and an application scenario is wider.

In a possible implementation, the page table in the host includes a plurality of pages, there is a mapping relationship between virtual addresses of some pages and a segment of a physical address space of the first memory space, and there is a mapping relationship between virtual addresses of some pages and a segment of a physical address space of a local memory. In this way, the host can perform remote storage addressing, and an addressing manner is byte-level addressing. This avoids protocol conversion overheads. It should be understood that, the memory usually performs remote storage addressing in a page table manner. The first memory space and the local memory uniformly perform remote storage addressing by using the page table, so that a large change to the host can be avoided, and then deployment of the storage system provided in this disclosure is more convenient.

In a specific implementation, because a capacity of the first memory space provided by the adapter card for the host is usually far greater than a capacity of the local memory 130 of the host, when the host 100 performs memory mapping, a smaller page capacity of each page in the page table indicates a finer granularity of memory space division and higher maintenance overheads. In this case, the plurality of pages may include a large page and a small page. For example, a capacity of the large page is 2 megabytes (MB), and a capacity of the small page is 4 kilobytes (kB). Certainly, the large page and the small page may be distinguished by using another numerical specification. This is not limited in this disclosure. When performing memory mapping, the host may perform mapping between a virtual address of a large page and the first address of the first memory space with a large storage capacity, and perform mapping between a virtual address of a small page and a physical address of the local memory with a small storage capacity, to obtain the first mapping relationship. Full mapping may be performed between the virtual address of the large page and the first address, so that no page fault exception occurs during process access. Full mapping may be performed between the virtual address of the small page and the address of the memory, or full mapping may not be performed between the virtual address of the small page and the address of the memory. This is not limited in this disclosure. If full mapping is not performed, a page fault exception may occur in the memory. However, this problem may be resolved by allocating a physical page of the memory. Details are not described herein.

In the foregoing implementation, the host uniformly manages the first memory space and the memory by using the page table. In this way, when accessing a large page 1 of the first memory space, the host may determine, based on the first mapping relationship, a first address 1 corresponding to the large page 1, and then send, to the adapter card, an access request carrying the first address 1. In this manner, efficient byte-level addressing of the host can be implemented, and the data can be directly written into a persistent memory. Compared with other persistent storage manners such as object storage, block storage, and file storage, in this storage manner, protocol conversion overheads required when the data is written from the memory into the hard disk are avoided, and data persistence efficiency is improved.

In a possible implementation, the adapter card writes the data into a second address of the second memory space of the storage node in a remote RDMA manner, where the first address in the first correspondence corresponds to the second address.

In the foregoing implementation, the adapter card is communicatively connected to the storage node in the RDMA manner. If the storage node connected to the adapter card is faulty, the adapter card may establish an RDMA communication connection to another storage node, so that a service of the host is not affected. Similarly, if the host is faulty, the storage node may establish a communication connection to an adapter card on another host, and the other host takes over the data in the storage node. This ensures that data is not lost due to a host fault.

In a possible implementation, the adapter card includes a cache, and the first correspondence includes a correspondence between the address of the first memory space and the cache, and the correspondence between the address of the first memory space and the physical address of the second memory space. When the adapter card receives a write request for the second address sent by the storage node, the adapter card may first write the data into a cache address in the cache, and update the first correspondence, so that the first address in the first correspondence corresponds to the cache address. Then, when an amount of data in the cache reaches a threshold, the adapter card writes the data into the second address of the second memory space of the storage node in the RDMA manner, and updates the first correspondence, where the first address in an updated first correspondence corresponds to the second address.

Optionally, the first correspondence may be stored into the adapter card by using an index. The index may be a page table of a memory management unit (MMU) of the adapter card. The MMU is computer hardware responsible for a memory access request of a central processing unit (CPU). The page table of the MMU may record a set of mapping rules between addresses. In this embodiment of this disclosure, the page table of the MMU in the adapter card records the first correspondence.

In a specific implementation, when the data is written, the MMU of the adapter card may allocate a cache address to the to-be-written large page based on a remaining cache space of the adapter card, update the index, and record a mapping relationship between the first address of the to-be-written large page and the newly allocated cache address. In addition, after the amount of data in the cache reaches the threshold, the MMU may write all the data in the cache into the second memory space of the storage node in the RDMA manner at a time, update the index, and record a mapping relationship between the second address and the first address of the large page written into the second memory space.

In a specific implementation, when data is read, and the adapter card receives the read request that is for the first address and that is sent by the host, the adapter card may determine, based on the first correspondence, an address corresponding to the first address. When the corresponding address is a cache address, the adapter card may process the read request for the first address based on the cache address, read the data from the cache address, and return the data to the host.

Optionally, when the address corresponding to the first address is the second address of the second memory space, the adapter card returns a cache miss message to the host, sends a read request for the second address to the storage node, receives the data returned by the storage node, stores the data into the cache, and updates the first correspondence. The first address in an updated first correspondence corresponds to the second address.

In the foregoing implementation, when receiving the read request sent by the host, the adapter card may first obtain, from the cache, the data requested by the host. This improves data reading efficiency. When receiving a write request sent by the host, the adapter card may first store, into the cache, the data that the host requests to write into the first memory space, and then remotely write the data in the cache into the storage node in batches in the RDMA manner. This reduces a quantity of times of RDMA operations performed by the adapter card, reduces a quantity of preparation times of a network interface card queue used for RDMA communication, reduces system resource consumption during data writing, and improves data writing efficiency.

In a possible implementation, the host includes a retry queue. The retry queue includes a missed data read request and context information of the missed data read request, and the retry queue is used by the host to resend the missed data read request to the adapter card based on the context information. The context information may record some specific information of the access request indicating the hit failure, such as what data needs to be read, where the data is obtained, and where the data needs to be returned after being obtained. The host may obtain the read request and the corresponding context information from the retry queue periodically or at a specific frequency to perform a retry. If a target page is hit, the read request is deleted from the retry queue; or if a target page is not hit, a next retry is waited until the target page is hit.

In the foregoing implementation, the host puts, into the retry queue, the read request indicating the hit failure, so that a related resource used to process the read request is released, and the related resource is used to process another service without waiting for long time for data return. This improves utilization of CPU resources. In addition, due to existence of the context information, when resending the read request, the host does not need to re-enter a kernel to perform a memory access page fault processing procedure like address association. This saves CPU resources.

In a possible implementation, a prefetcher may be further disposed in the adapter card. The prefetcher may predict prefetched data to be accessed by an application, and then store the prefetched data into the cache. This improves access efficiency of the storage system. For example, it is assumed that a large page P1 is the prefetched data that is predicted by the prefetcher and that is to be accessed by the application. When all data in the cache is written into the second memory space of the storage node in the RDMA manner at a time, the large page P1 is reserved in the cache. In this way, when the application accesses the large page P1, the data may be directly read from the cache of the adapter card. In a specific implementation, the prefetcher may be implemented by using dedicated hardware in a processor. The hardware monitors instructions or data that are/is requested in a program that is being executed, and identifies prefetched data required by a next program. Alternatively, the prefetcher may analyze code by using a compiler, and then insert a prefetch instruction in a program compilation process. In this way, in a program execution process, a prefetch action is performed at a location at which the prefetch instruction is inserted. It should be understood that the foregoing example is used for description, and a specific implementation of the prefetcher is not limited in this disclosure.

In the foregoing implementation, the prefetcher is configured in the adapter card, and the predicted prefetched data to be accessed by the application may be prefetched from the storage node to the cache of the adapter card. In this way, when the host requests to read the prefetched data from the first memory space, the adapter card can read the data from the cache and return the data to the host. This improves data reading efficiency of the host.

In a possible implementation, cold page eviction logic may be further set in the CPU of the adapter card. If a page is not accessed by the host for long time, the adapter card may write the page into the storage node in the RDMA manner. If a hot page is frequently accessed by the host, when an amount of data in the cache reaches a threshold and needs to be all written into the storage node at a time, the hot page may be reserved in the cache.

In the foregoing implementation, the cold page eviction logic is configured in the adapter card, so that data from a cold page that is not accessed by the host for long time can be written into the storage node in advance. This saves a storage space of the cache. Data from the hot page frequently accessed by the host is stored into the cache. This improves a cache hit rate, and further improves data reading efficiency of the host.

According to a second aspect, this disclosure provides a data storage system. The data storage system includes a host, an adapter card, and a storage node. The host establishes a communication connection to the adapter card through a bus, and the storage node establishes a communication connection to the adapter card through a network. The host is configured to send, to the adapter card, data that the host requests to write into a first address of a first memory space, where the first memory space is a storage space that is provided by the adapter card for the host and that supports memory semantic access. The adapter card is configured to write the data into a second memory space of the storage node, where the adapter card includes a first correspondence between a physical address of the second memory space and an address of the first memory space.

In a possible implementation, the host includes a second correspondence between the address of the first memory space and a virtual memory address of an application.

In a possible implementation, the adapter card is configured to write the data into a second address of the second memory space of the storage node in an RDMA manner, where the first address in the first correspondence corresponds to the second address.

In a possible implementation, the adapter card includes a cache, and the first correspondence includes a correspondence between the address of the first memory space and the cache, and the correspondence between the address of the first memory space and the physical address of the second memory space.

In a possible implementation, the adapter card is configured to: write the data into a cache address in the cache, and update the first correspondence, so that the first address in the first correspondence corresponds to the cache address; and the adapter card is configured to: when the amount of data in the cache reaches a threshold, write the data into the second address of the second memory space of the storage node in the RDMA manner, and update the first correspondence, so that the first address corresponds to the second address.

In a possible implementation, the host is configured to send a read request for the first address to the adapter card; the adapter card is configured to determine, based on the first correspondence, an address corresponding to the first address; and the adapter card is configured to: when the address corresponding to the first address is the cache address, process the read request for the first address based on the cache address.

In a possible implementation, the adapter card is configured to: when the address corresponding to the first address is the second address of the second memory space, return a cache miss message to the host; the adapter card is configured to send a read request for the second address to the storage node; and the adapter card is configured to: receive the data sent by the storage node, store the data into the cache, and update the first correspondence.

In a possible implementation, the host includes a retry queue. The retry queue includes a missed data read request and context information of the missed data read request, and the retry queue is used by the host to resend the missed data read request to the adapter card based on the context information.

In a possible implementation, the second memory space is an NVDIMM.

In a possible implementation, the bus includes one or more of a PCIe bus, a CXL bus, and a GenZ bus.

According to a third aspect, this disclosure provides an adapter card, used in a data storage system. The data storage system includes a host, the adapter card, and a storage node. The host establishes a communication connection to the adapter card through a bus, and the storage node establishes a communication connection to the adapter card through a network. The adapter card includes: a receiving unit, configured to receive data that the host requests to write into a first address of a first memory space, where the first memory space is a storage space that is provided by the adapter card for the host and that supports memory semantic access; and a writing unit, configured to write the data into a second memory space of the storage node, where the adapter card includes a first correspondence between a physical address of the second memory space and an address of the first memory space.

In a possible implementation, the writing unit is configured to write the data into a second address of the second memory space of the storage node in an RDMA manner, where the first address in the first correspondence corresponds to the second address.

In a possible implementation, the adapter card includes a cache, and the first correspondence includes a correspondence between the address of the first memory space and the cache, and the correspondence between the address of the first memory space and the physical address of the second memory space.

In a possible implementation, the writing unit is configured to: write the data into a cache address in the cache, and update the first correspondence, so that the first address in the first correspondence corresponds to the cache address; and the writing unit is configured to: when the amount of data in the cache reaches a threshold, write the data into the second address of the second memory space of the storage node in the RDMA manner, and update the first correspondence, so that the first address corresponds to the second address.

In a possible implementation, the adapter card includes a reading unit. The receiving unit is configured to receive a read request that is for the first address and that is sent by the host; the reading unit is configured to determine, based on the first correspondence, an address corresponding to the first address; and the reading unit is configured to: when the address corresponding to the first address is the cache address, process the read request for the first address based on the cache address.

In a possible implementation, the reading unit is configured to: when the address corresponding to the first address is the second address of the second memory space, return a cache miss message to the host; the reading unit is configured to send a read request for the second address to the storage node; and the receiving unit is configured to: receive the data sent by the storage node, store the data into the cache, and update the first correspondence.

In a possible implementation, the second memory space is an NVDIMM.

In a possible implementation, the bus includes one or more of a PCIe bus, a CXL bus, and a GenZ bus.

According to a fourth aspect, this disclosure provides a computing device, including a processor and a memory. The memory is configured to store code, and the processor is configured to execute the code to implement the method described in the first aspect.

According to a fifth aspect, this disclosure provides a storage access configuration method. The method includes the following steps: an adapter card provides, for a host, a storage space that supports memory semantic access; and the adapter card establishes a correspondence between the storage space and a physical address of a persistent storage device of a storage node.

In a possible implementation, the adapter card is connected to the storage node through a network.

In a possible implementation, the adapter card accesses the physical address in an RDMA manner.

In a possible implementation, the persistent storage device is an NVDIMM.

According to a sixth aspect, this disclosure provides an adapter card. The adapter card includes an interface and a processor. The processor is configured to: provide, for a host, a storage space that supports memory semantic access; and establish a correspondence between the storage space and a physical address of a persistent storage device of a storage node.

In a possible implementation, the adapter card is connected to the storage node through a network.

In a possible implementation, the adapter card accesses the physical address in an RDMA manner.

In a possible implementation, the persistent storage device is an NVDIMM.

According to a seventh aspect, this disclosure provides a computer-readable storage medium. The computer-readable storage medium stores instructions. When the instructions are run on a computer, the computer is enabled to perform the methods in the foregoing aspects.

According to an eighth aspect, this disclosure provides a computer program product including instructions. The computer program product includes a computer program or the instructions. When the computer program or the instructions is/are run on a computer, the computer is enabled to perform the methods in the foregoing aspects.

Based on the implementations provided in the foregoing aspects, this disclosure may further combine technologies in this disclosure to provide more implementations.

DESCRIPTION OF EMBODIMENTS

Figure 1:
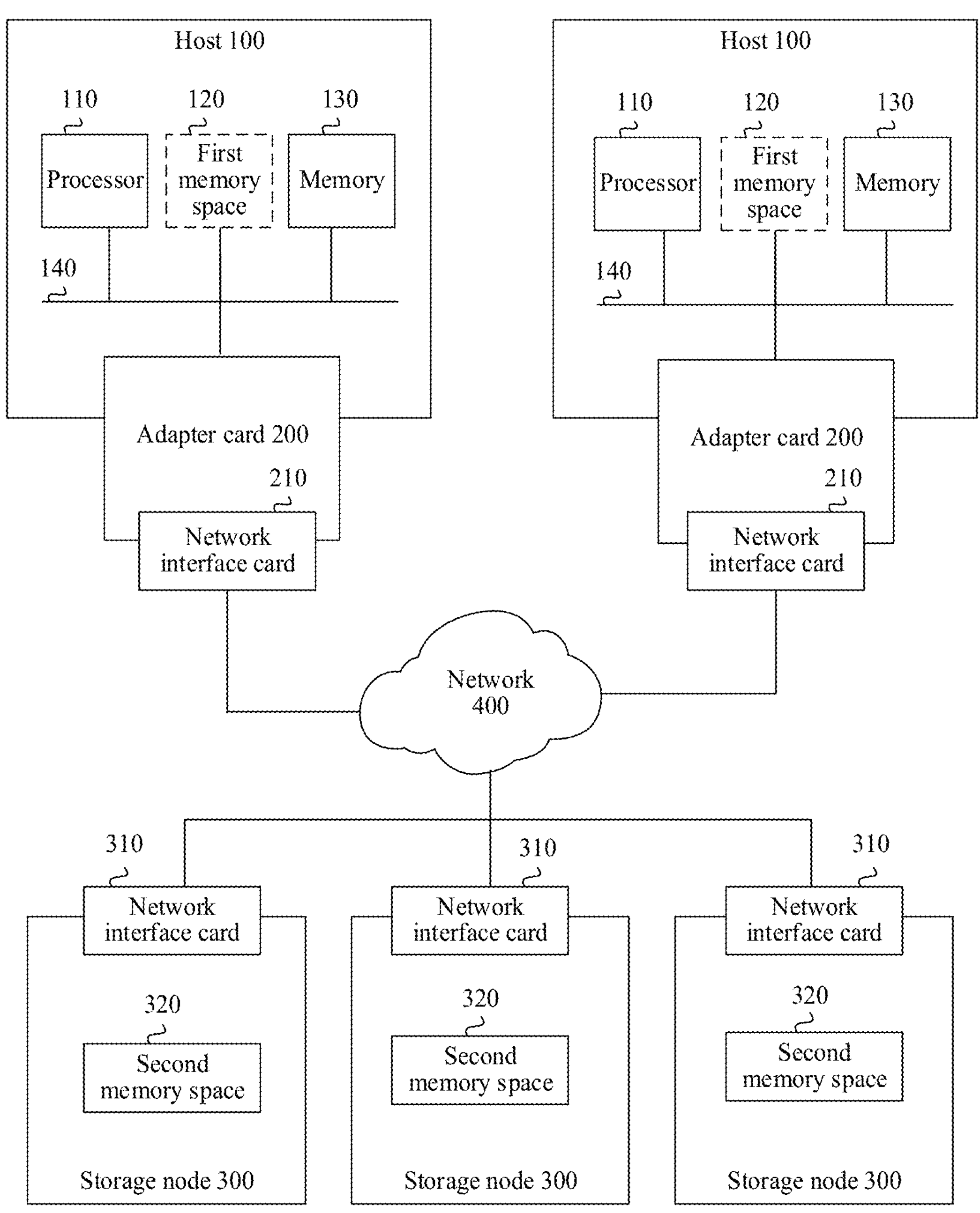
FIG. 1 shows a storage system according to this disclosure.

The following describes the technical solutions in embodiments of the present disclosure with reference to the accompanying drawings in embodiments of the present disclosure. It is clear that the described embodiments are merely some rather than all of embodiments of the present disclosure. All other embodiments obtained by a person of ordinary skill in the art based on embodiments of the present disclosure without creative efforts shall fall within the protection scope of the present disclosure.

An application scenario in this disclosure is first described.

Both distributed storage and centralized storage relate to a manner of accessing data by an application server. Currently, the application server accesses data in three manners: block-level, file-level, and object-level. The application server stores data in a memory into a persistent medium like a hard disk in a form of a file, an object, or a block.

Because there is a difference between memory access and hard disk access, the hard disk does not support memory semantics access, and protocol conversion overheads are inevitable in a process of performing persistence on the three software structures. For example, an application server of block-level storage communicates with the persistent medium according to Internet Small Computer Systems Interface (iSCSI) or another protocol; an application server of file-level storage communicates with the persistent medium according to a file access protocol like a network file system (NFS), a Common Internet File System (CIFS), or a Server Message Block (SMB); and an application server of object-level storage communicates with the persistent medium according to a Hypertext Transfer Protocol (HTTP) or another network protocol. The protocol conversion overheads consume system resources, and affect data persistence efficiency of the application server.

An NVDIMM is a special type of memory. Because the NVDIMM has a large capacity and has a characteristic of retaining content when power is removed, data may be directly stored into the NVDIMM for data persistence without being written into the hard disk. This avoids protocol conversion overheads during data persistence, and improves data persistence efficiency. The NVDIMM is widely used in an in-memory database, real-time big data analysis, large model artificial intelligence (AI) training, and other scenarios.

However, the NVDIMM still has many performance problems. For example, the NVDIMM is usually inserted into a memory slot of a host in a form of a memory module, a quantity of memory slot locations of the host is limited, and capacity scalability is poor. In addition, after the host is faulty, the NVDIMM inserted into the memory slot of the host cannot be accessed by another host or even is completely lost. Consequently, single-host reliability is poor.

In conclusion, there are protocol conversion overheads in three access models of the current storage system, affecting access efficiency of the storage system. However, the NVDIMM without protocol conversion overheads has limited performance, and has problems such as poor scalability and poor single-host reliability.

To resolve the foregoing problems, this disclosure provides a storage system. In the system, an adapter card establishes a communication connection to a host through a bus, and establishes a communication connection to a storage node through a network. The adapter card may provide, for the host based on a size of a second memory space of the storage node, a first memory space that supports memory semantic access. When performing data persistence, the host may write data into the first memory space by using a memory semantic request. In response to the request, the adapter card persists the data to the second memory space of the storage node in an RDMA manner. In this way, the host does not need to perform protocol conversion when performing data persistence, to improve access efficiency of the storage system. In addition, the adapter card does not occupy a memory slot location of the host, and capacity scalability is higher. Further, when the host is faulty, the storage node may establish a communication connection to an adapter card on another host, and the data in the storage node may still be accessed by the other host, so that single-host reliability is improved.

FIG. 1 shows a storage system according to this disclosure. The storage system may include a host 100, an adapter card 200, and a storage node 300. The adapter card 200 is connected to the host 100 through an internal bus 140, and the adapter card 200 communicates with the storage node 300 through a network 400. There may be one or more hosts 100, adapter cards 200, and storage nodes 300. One host 100 may be connected to a plurality of adapter cards 200, and one adapter card may also be connected to a plurality of storage nodes 300. In FIG. 1, two hosts 100, two adapter cards 200, and three storage nodes 300 are used as an example for description. A quantity of hosts 100, a quantity of storage nodes 300, and a quantity of adapter cards 200 are not limited in this disclosure.

The host 100 may be a physical server, for example, an X86 server or an Advanced RISC Machines (ARM) server, or may be a virtual machine (VM) implemented based on a general-purpose physical server in combination with a network functions virtualization (NFV) technology. The VM is a complete software-simulated computer system that has complete hardware system functions and that runs in an entirely isolated environment. This is not limited in this disclosure.

The adapter card 200 may include an interface and a processor. The processor may include an integrated circuit and/or a component. Optionally, the adapter card 200 may be a processor DPU, a network processor (neural-network processing unit (NPU)), a host bus adapter (HBA), or the like. This is not limited in this disclosure. The adapter card 200 may also include a mainboard, which is also referred to as a PCB. A chip is printed on the mainboard. The interface may include a frontend interface and a backend interface. The frontend interface is configured to communicate with the host 100, and the backend interface is configured to communicate with the storage node.

In a specific implementation, the adapter card 200 may be connected to the host 100 through the bus 140. That is, the frontend interface of the adapter card 200 communicates with the host 100 through the bus. The bus 140 may be a PCIe bus, an Extended Industry Standard Architecture (EISA) bus, a unified bus (Ubus or UB), a CXL bus, a Cache Coherent Interconnect for Accelerators (CCIX) bus, a GenZ bus, or the like. The bus 140 may be classified into an address bus, a data bus, a control bus, a power bus, a status signal bus, and the like. However, for clear description, various types of buses in the figure are marked as the bus 140.

In a specific implementation, the adapter card may be inserted into a bus interface of the host 100 in a plug-in manner, for example, inserted into a PCI bus interface or a CXL bus interface, or may be printed on a mainboard of the host 100 together with another part, chip, or component of the host 100 during processing. This is not limited in this disclosure.

The storage node 300 may be a physical server, for example, an X86 server or an ARM server, or may be a VM implemented based on a general-purpose physical server in combination with an NFV technology. The VM is a complete software-simulated computer system that has complete hardware system functions and that runs in an entirely isolated environment. This is not limited in this disclosure. Alternatively, the storage node 300 may be a storage device or a storage array that has a storage function. This is not limited in this disclosure.

In a specific implementation, the storage node 300 may be communicatively connected to the adapter card 200 through the network 400. The network 400 may be an RDMA network. A network interface card 210 on the adapter card 200 may write data into a network interface card 310 on the storage node 300 by using an RDMA technology, or data may be read from the storage node 300 to the network interface card 210 on the adapter card 200 by using the RDMA technology, to implement data communication between the storage node 300 and the adapter card 200.

Further, the host 100, the adapter card 200, and the storage node 300 may be divided into a plurality of unit modules. For example, as shown in FIG. 1, the host 100 may include a processor 110, a first memory space 120, a memory 130, and the bus 140, the adapter card 200 may include the network interface card 210, and the storage node 300 may include the network interface card 310 and a second memory space 320. It should be understood that, for ease of description, FIG. 1 shows only hardware resources such as a processor and a memory inside the host 100, the adapter card 200, and the storage node 300. In a specific implementation, the host 100, the adapter card 200, and the storage node 300 may further include hardware resources such as a hard disk and software resources such as an operating system and an application that need to be run. Details are not described herein.

The processor 110 in the host 100 may include at least one general-purpose processor, for example, a CPU or a combination of a CPU and a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), a generic array logic (GAL), or any combination thereof. The processor 110 is configured to execute various types of digital storage instructions. For example, the processor 110 may be configured to execute code stored into the memory 130, to enable the host 100 to provide a plurality of types of services.

The network interface card 210 in the adapter card 200 and the network interface card 310 in the storage node 300 each may be an intelligent network interface card having an RDMA function, for example, an RDMA enabled network interface card (RDMA enabled nic or RNIC), or may be a network interface card or a switch that supports an infinite bandwidth (InfiniBand (IB)) function. This is not limited in this disclosure.

The memory 130 in the host 100 may be a volatile memory, for example, a random-access memory (RAM), a dynamic random-access memory (DRAM), a static random-access memory (SRAM), a synchronous dynamic random-access memory (SDRAM), a double data rate synchronous dynamic random-access memory (double data rate RAM or DDR), or a cache. The memory 130 may alternatively include a combination of the foregoing types.

The second memory space 320 in the storage node 300 may be a storage space of a persistent storage device. The persistent storage device may be an NVDIMM, for example, a DDR, a storage class memory (SCM), or a computer flash memory device (NAND flash memory, NAND). The first memory space 120 in the host 100 is mapping constituted by the second memory space 320 in the storage node 300 in a software manner. Briefly, when the host 100 requests to persist data into the first memory space 120, the data may be remotely written into the second memory space 320 of the storage node 300 by using the adapter card 200. The adapter card 200 includes a first correspondence between a physical address of the second memory space 320 and an address of the first memory space 120.

In this embodiment of this disclosure, after the adapter card 200 establishes a connection to the host 100 through the bus, and establishes a connection to the storage node through the network 400, the adapter card 200 may provide, for the host 100 according to a storage access configuration method provided in this disclosure, a storage space that supports memory semantic access, namely, the first memory space 120, and then establish a correspondence between the storage space and a physical address of the persistent storage device of the storage node 300. The persistent storage device may be the second memory space 320, and the correspondence may be the first correspondence. The adapter card 200 may first obtain specification information of the second memory space 320 on the storage node 300 connected to the adapter card 200, and then provide the first memory space 120 for the host 100 based on the specification information. A memory-type storage device that supports memory semantic access may be a character device that supports memory semantic access, or certainly may be another memory-type storage device that supports a memory access protocol like XCL and GenZ. This is not limited in this disclosure.

In a specific implementation, a plurality of adapter cards 200 may be inserted into one host 100. Each adapter card may establish a communication connection to one or more storage nodes 300, and each adapter card 200 may provide one first memory space for the host 100. The first memory space may be mapping of one second memory space on one storage node, or may be mapping between a plurality of second memory spaces on one storage node, or may be mapping between different second memory spaces on different storage nodes. This is not limited in this disclosure.

Figure 2:
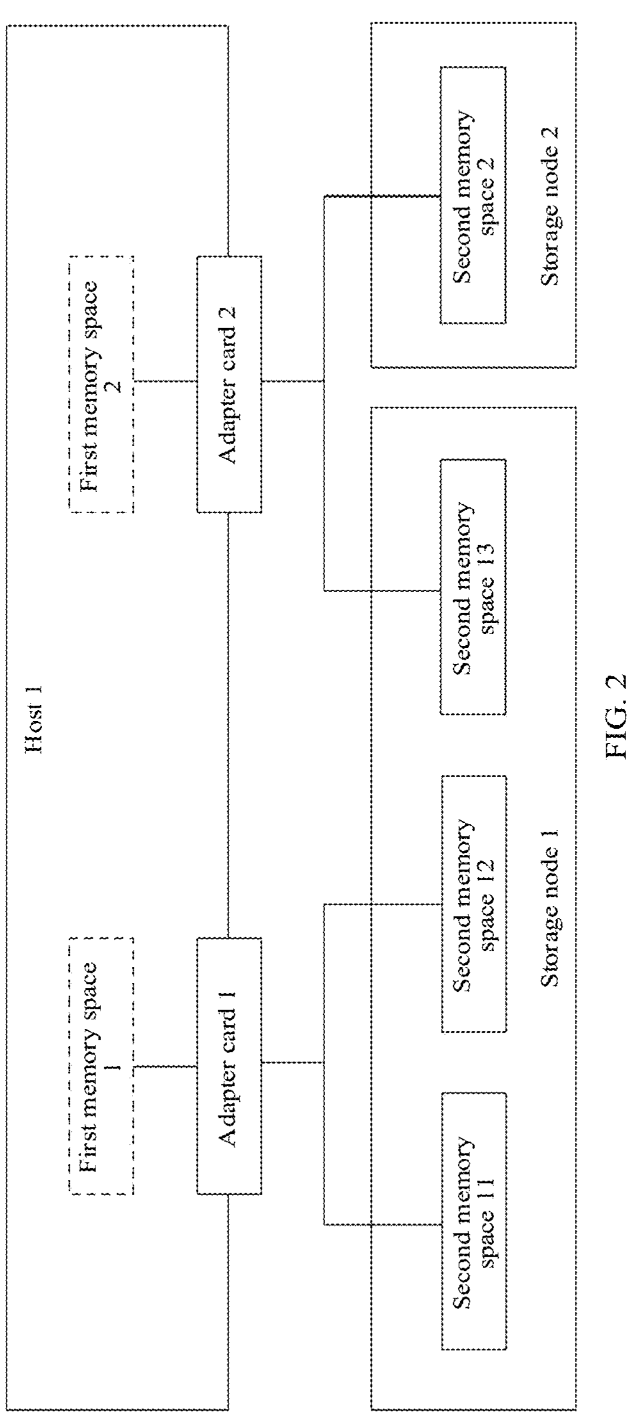
FIG. 2 is a diagram of a structure of a storage system in an application scenario according to this disclosure.

For example, FIG. 2 is a diagram of a structure of a storage system in an application scenario according to this disclosure. As shown in FIG. 2, two adapter cards are inserted into a bus interface of a host 1. An adapter card 1 is connected to a second memory space 11 and a second memory space 12 of a storage node 1, and a first memory space 1 provided by the adapter card 1 for the host 1 indicates mapping between the second memory space 11 and the second memory space 12. An adapter card 2 is connected to a second memory space 13 of the storage node 1 and a second memory space 2 of a storage node 2, and a first memory space 2 provided by the adapter card 2 for the storage node 1 indicates mapping between the second memory space 13 and the second memory space 2.

It should be noted that the second memory space in FIG. 2 may be a complete storage space provided by an NVDIMM, or may be a part of a storage space provided by an NVDIMM. The second memory space 11 and the second memory space 12 may be storage spaces obtained by dividing a same NVDIMM in the storage node, or may be storage spaces obtained by dividing different NVDIMMs. For example, the second memory space 11 belongs to an NVDIMM 1, and the second memory space 12 belongs to an NVDIMM 2. This is not limited in this disclosure.

It may be understood that the host may access the first memory space 120 in a memory semantic manner. Compared with block-level, file-level, and object-level access manners, the memory semantic manner does not require data to be persisted from a memory to a hard disk, thereby avoiding protocol overheads during data read/write, and improving data read/write efficiency. In addition, compared with a manner in which an NVIDIMM is directly inserted into the host, the storage system in this disclosure does not occupy a memory slot, does not affect a capacity of the local memory 130 of the host 100, does not preempt a memory bandwidth of the local memory 130, and can have stronger capacity scalability. In addition, even if a storage node connected to the adapter card 200 is faulty, the adapter card 200 may establish an RDMA communication connection to another storage node 300, and a service of the host 100 is not affected. Similarly, if the host 100 is faulty, the storage node 300 may establish a communication connection to an adapter card 200 on another host 100, and the other host 100 takes over data in the second memory space 320 of the storage node 300. This ensures that data is not lost due to a host fault. Therefore, the storage system in this disclosure has higher read/write efficiency, stronger capacity scalability, higher data reliability, and a stronger multi-host shared access capability.

It should be noted that the storage system in this disclosure may coexist with block-level, file-level, object-level, and other storage manners. Briefly, the storage node may further include a storage medium. The storage medium is configured to perform persistent block-level, file-level, and object-level storage. The host 100 may perform data persistence on different data in different manners based on a service requirement. During actual deployment, the storage system in this disclosure may coexist with an existing storage system, and the existing storage system does not need to greatly change. The storage system in this disclosure has good adaptability, provides a user with storage manners in more forms, and improves user experience.

Further, the application in the host 100 may load and unload the first memory space 120 in a memory mapping manner. Memory mapping means that a physical address space of the first memory space 120 is mapped to a virtual memory space of a process of the application, so that the process of the application may read and modify the first memory space 120. This improves processing efficiency of the application. In a specific implementation, the first memory space 120 may be loaded by using a memory mapping function mmap, and the first memory space 120 may be unloaded by deleting a mapping relationship by using a munmap function. Alternatively, another manner is used. This is not limited in this disclosure.

After performing memory mapping, the host 100 may obtain a second correspondence between an address of the first memory space and a virtual memory address of the application. The second correspondence may be stored by using a page table. When requesting to write data into the first memory space, the host 100 may first determine, based on a first virtual memory address that needs to be accessed by the application and the second correspondence recorded in the page table, a first address corresponding to the first virtual memory address, and then send a write request for the first address to the adapter card. The write request for the first address includes the data that the host requests to write into the first memory space. In response to the write request for the first address, the adapter card 200 writes the data into a second address of the second memory space of the storage node in an RDMA manner, and updates the first correspondence, so that the first address in the first correspondence corresponds to the second address.

In a specific implementation, the page table in the host 100 includes a plurality of pages, there is a mapping relationship between virtual addresses of some pages and a segment of a physical address space of the first memory space 120, and there is a mapping relationship between virtual addresses of some pages and a segment of a physical address space of the local memory 130. In this way, the host 100 can perform remote storage addressing, and an addressing manner is byte-level addressing. This avoids protocol conversion overheads. It should be understood that, the memory 130 usually performs remote storage addressing in a page table manner. The first memory space 120 and the local memory 130 uniformly perform remote storage addressing by using the page table, so that a large change to the host 100 can be avoided, and then deployment of the storage system provided in this disclosure is more convenient.

In a specific implementation, because a capacity of the first memory space provided by the adapter card 200 for the host 100 is usually far greater than a capacity of the local memory 130 of the host 100, when the host 100 performs memory mapping, a smaller page capacity of each page in the page table indicates a finer granularity of memory space division and higher maintenance overheads. In this case, the plurality of pages may include a large page and a small page. For example, a capacity of the large page is 2 MB, and a capacity of the small page is 4 kB. Certainly, the large page and the small page may be distinguished by using another numerical specification. This is not limited in this disclosure. When performing memory mapping, the host 100 may perform mapping between a virtual address of a large page and the first address of the first memory space 120 with a large storage capacity, and perform mapping between a virtual address of a small page and a physical address of the memory 130 with a small storage capacity, to obtain the first mapping relationship. Full mapping may be performed between the virtual address of the large page and the first address, so that no page fault exception occurs during process access. Full mapping may be performed between the virtual address of the small page and the address of the memory 130, or full mapping may not be performed between the virtual address of the small page and the address of the memory 130. This is not limited in this disclosure. If full mapping is not performed, a page fault exception may occur in the memory 130. However, this problem may be resolved by allocating a physical page of the memory 130. Details are not described herein.

It should be understood that the host 100 uniformly manages the first memory space 120 and the memory 130 by using the page table. In this way, when accessing a large page 1 of the first memory space 120, the host 100 may determine, based on the first mapping relationship, a first address 1 corresponding to the large page 1, and then send, to the adapter card 200, an access request carrying the first address 1. The adapter card 200 may send, based on a physical address in the access request, the access request to the second memory space 320 of the storage node corresponding to the physical address, so that the storage node performs a corresponding read/write operation on the second memory space 320. In this manner, efficient byte-level addressing of the host 100 can be implemented, and the data can be directly written into a persistent memory. Compared with other persistent storage manners such as object storage, block storage, and file storage, in this storage manner, protocol conversion overheads required when the data is written from the memory into the hard disk are avoided, and data persistence efficiency is improved.

Figure 3:
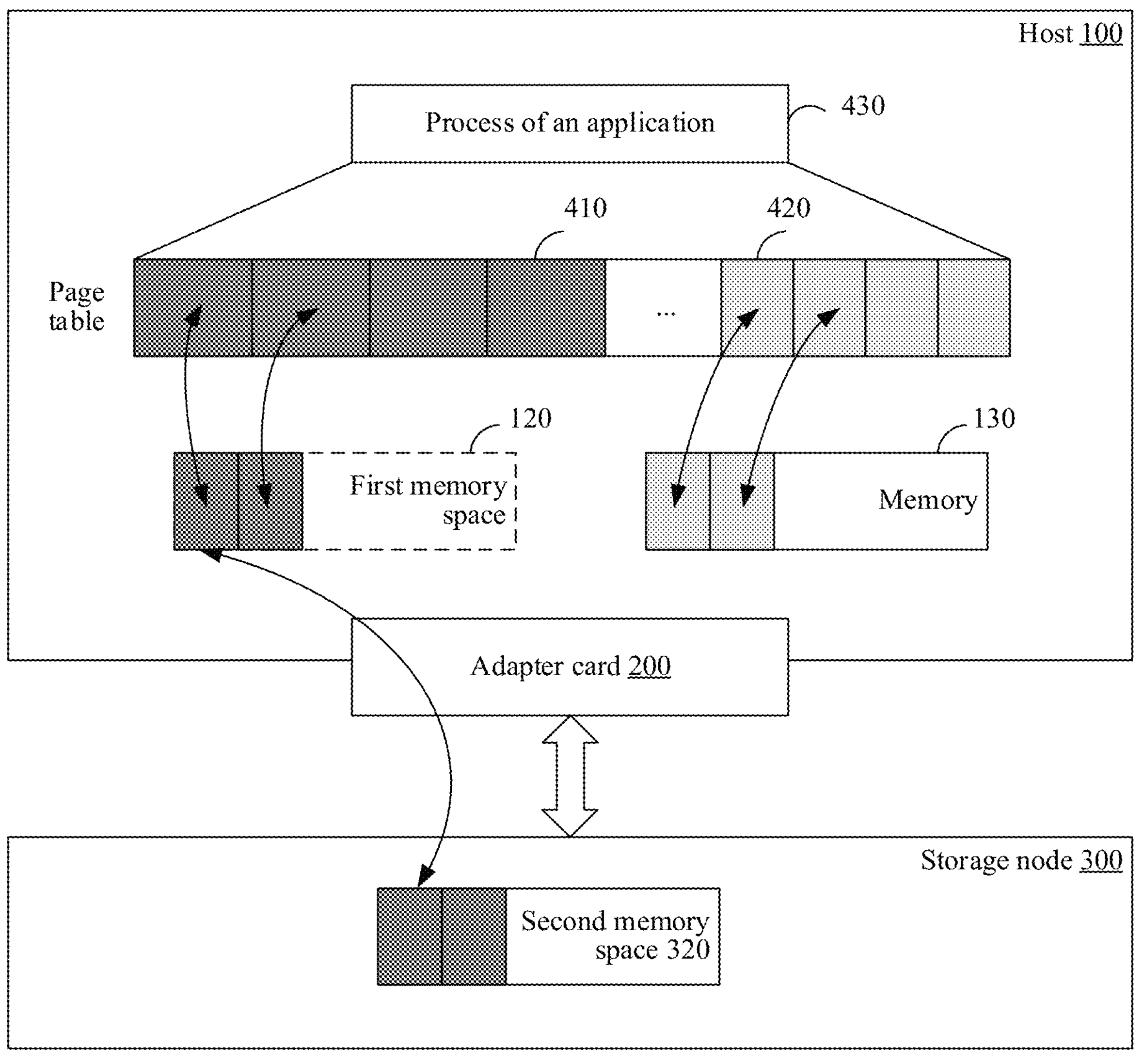
FIG. 3 is a diagram of a memory mapping relationship according to this disclosure.

For example, FIG. 3 is a diagram of a memory mapping relationship according to this disclosure. A page table in a host 100 includes a large page 410 and a small page 420. There is a mapping relationship between a virtual address of each large page 410 and a physical address of a first memory space 120, and there is a mapping relationship between a virtual address of each small page 420 and a physical address of a memory 130.

In this architecture, when a process 430 of an application performs a read/write operation on the small page 420, the process 430 actually performs the read/write operation on the memory 130. For example, data is written into the memory 130. When performing a read/write operation on the large page 410, the process 430 first obtains the physical address of the first memory space corresponding to the large page 410, and then sends, to the adapter card 200, an access request carrying the physical address. The access request may be a data read request or a data write request. The adapter card 200 may send, based on the physical address in the access request, the access request to the second memory space 320 of the storage node corresponding to the physical address. After the second memory space 320 of the storage node receives the access request, the process 430 may process the access request, and perform a corresponding read/write operation on the second memory space 320. It should be understood that FIG. 3 is used as an example for description. A quantity of large pages and a quantity of small pages are not limited in this disclosure.

Figure 4:
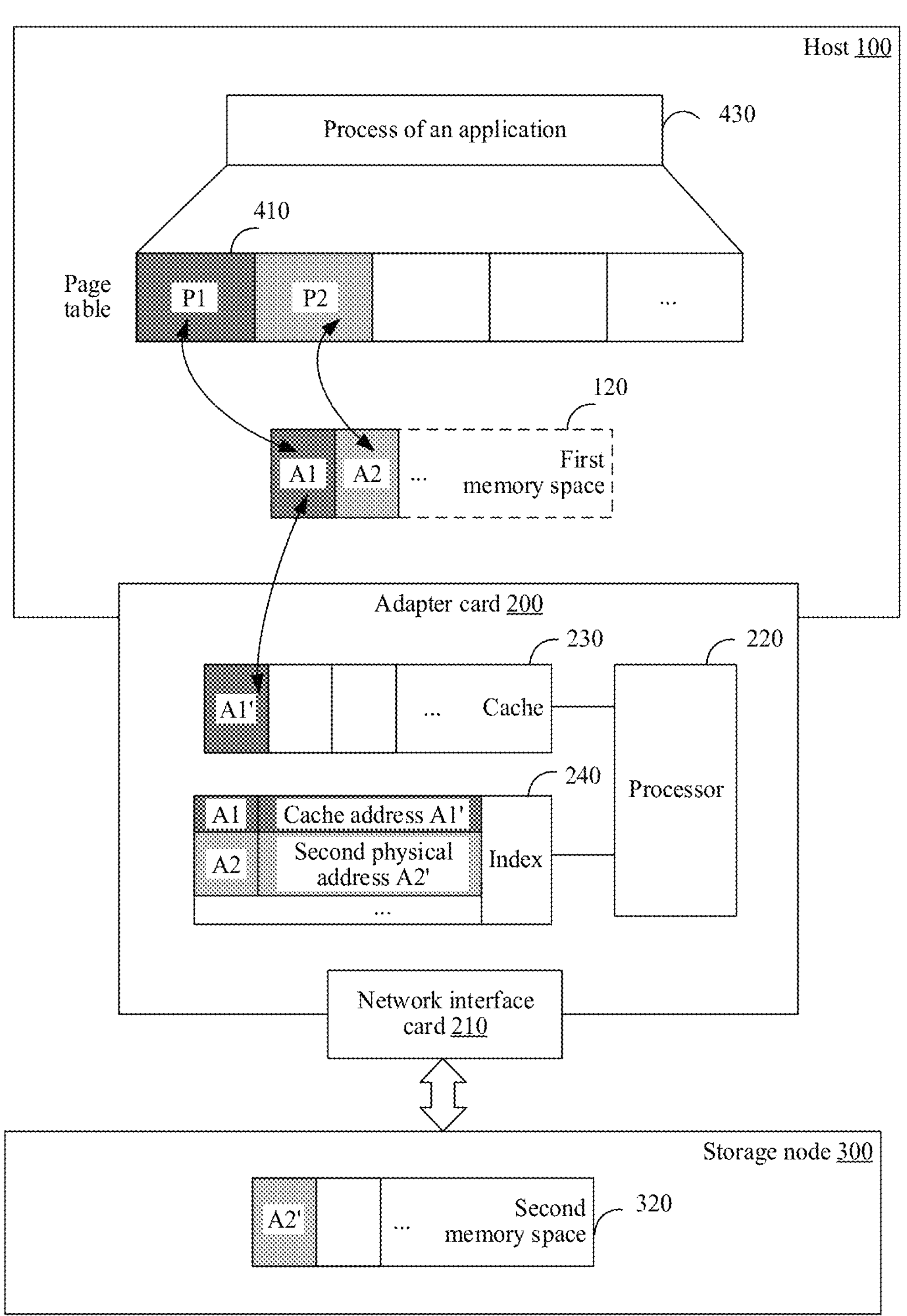
FIG. 4 is a diagram of a structure of a storage system in another application scenario according to this disclosure.

In an embodiment, the adapter card 200 may be configured with a cache, configured to cache the data written by the host 100 into the first memory space 120. FIG. 4 is a diagram of a structure of a storage system in another application scenario according to this disclosure. The adapter card 200 includes a network interface card 210, a processor 220, a cache 230, and an index 240. For the network interface card 210, refer to the embodiment in FIG. 1. Details are not described herein again.

The processor 220 may include at least one general-purpose processor, for example, a CPU or a combination of a CPU and a hardware chip. The hardware chip may be an ASIC, a PLD, or a combination thereof. The PLD may be a CPLD, an FPGA, a GAL, or any combination thereof. The processor 220 is configured to execute various types of digital storage instructions, so that the adapter card 200 implements various functions.

When the host 100 writes data into the first address of the first memory space 120, the data may be first written into the cache 230 of the adapter card 200. When an amount of data in the cache 230 reaches a threshold, all the data is written into the second address of the second memory space 320 in an RDMA manner at a time. This reduces a quantity of RDMA times, and improves communication efficiency between the adapter card 200 and the storage node 300. It should be understood that the operation of writing all the data in the cache 230 into RDMA at a time by the adapter card 200 may be performed when the amount of data reaches the threshold, or may be performed at a fixed frequency, or may be performed at a fixed time point, or may be performed when another preset condition is met. This is not limited in this disclosure.

The first correspondence in the adapter card 200 includes a correspondence between the first address and the second address of the second memory space 320, and further includes a correspondence between the first address and a cache address of the cache 230. Briefly, if a large page corresponding to the first address is stored into the cache address of the cache 230, the first correspondence records the correspondence between the first address and the cache address. If the large page corresponding to the first address is written into the second address of the second memory space 320 by the adapter card 200 in the RDMA manner, the first correspondence records the correspondence between the first address and the second address.

In a specific implementation, the first correspondence may be stored into the adapter card 200 by using the index 240. The index 240 may be a page table of a MMU of the adapter card 200. The MMU may be a unit module in the processor 220. The page table of the MMU may record a set of mapping rules between addresses. In this embodiment of this disclosure, the page table of the MMU in the adapter card 200 records the first correspondence.

In an embodiment, when writing the data, the adapter card 200 may allocate a cache address to the to-be-written large page based on a remaining cache space of the adapter card, update the index 240, and record a mapping relationship between the first address of the to-be-written large page and the newly allocated cache address. In addition, after the amount of data in the cache reaches the threshold, the adapter card 200 may write all the data in the cache into the second memory space 320 of the storage node 300 in the RDMA manner at a time, update the index 240, and record a mapping relationship between the second address and the first address of the large page written into the second memory space 320.

For example, as shown in FIG. 4, if the host 100 requests to write the data into a large page P1 in the first memory space 120, and the host 100 determines, based on the page table, that a first address corresponding to the large page P1 is A1, the host 100 sends, to the adapter card 200, a data read request carrying the first address A1. In response to the data read request, the adapter card 200 may write the data into a cache address A1', and update the index, so that the first address corresponds to the cache address A1'. It is assumed that when the adapter card 200 remotely writes, in the RDMA manner, data corresponding to a first address A2 into the second address A2' of the second memory space 320 of the storage node 300, the adapter card 200 may update the index, so that the first address A2 corresponds to a second address A2'. It should be understood that FIG. 4 is used as an example for description. A specific form of the index is not limited in this disclosure.

In an embodiment, during data reading, after the host 100 sends, to the adapter card 200, a read request carrying the first address, the adapter card 200 may determine, based on the index, whether a target page corresponding to the first address is stored into the cache 230. If the cache of the adapter card 200 hits the target page that the host needs to read, the adapter card 200 may return the target page to the host 100. This improves data reading efficiency. If the cache 230 of the adapter card 200 does not hit the target page that the host 100 needs to access, the adapter card 200 may return, to the host 100, information indicating a hit failure, where the information may be a hard interrupt request, and then initiate, by using the network interface card 210, an RDMA request for remotely reading the target page. The adapter card 200 reads the target page into the cache 230, updates the index 240, and records a cache address corresponding to a first address of the page. After the host 100 sends the access request of the target page to the cache 230 again, the adapter card 200 may read the page based on the index 240, and return the page to a register of the host 100.

Optionally, the host 100 may maintain a retry queue. The retry queue is used to store an access request indicating a hit failure in the cache 230 and context information of the request. The context information may record some specific information of the access request indicating the hit failure, such as what data needs to be read, where the data is obtained, and where the data needs to be returned after being obtained. The host 100 may obtain the read request and the corresponding context information from the retry queue periodically or at a specific frequency to perform a retry. If the target page is hit, the read request is deleted from the retry queue; or if the target page is not hit, a next retry is waited until the target page is hit.

For example, as shown in FIG. 4, if the host 100 requests to read a large page P2 in the first memory space 120, and determines, based on the page table, that a first address corresponding to the large page P2 is A2, the host 100 sends, to the adapter card 200, a read request carrying the first address A2. In response to the read request, the adapter card 200 may determine, based on the index 240, that the first address A corresponds to a second address A2', and it indicates that the large page P2 is not stored into the cache, and the large page P2 is persisted to the second address A2' of the second memory space 320. The adapter card 200 may send a hard interrupt request to the host 100, to notify the host 100 that the page fails to be read this time, and then send, to the storage node 300, a data read request carrying the second address A2'. The storage node 300 writes the large page P2 into the cache 230 of the adapter card 200 by using an RDMA technology, updates the index 240, and records a correspondence between the cache address A2' and the first address A2 corresponding to the large page P2.

In addition, after receiving the hard interrupt request sent by the adapter card 200, the host 100 places, into a retry queue, a read request indicating a hit failure. The host 100 may periodically execute each request in the retry queue, and resend, to the adapter card 200, the read request carrying the first address A2. In this case, the large page P2 is written into a cache space corresponding to the cache address A2', and the adapter card 200 may read the large page P2 based on the updated index 240, and return the large page P2 to the host 100.

It may be understood that, after receiving information indicating the hit failure, a CPU may put, into the retry list, the read request indicating the hit failure and context information of the request, and the CPU may release a related resource used to process the read request, to process another service without waiting for long time for data return. This improves utilization of CPU resources. In addition, the host 100 may obtain, from the retry list, the read request indicating the hit failure and the context information of the request at other time, and resend the read request to the adapter card 200. Due to existence of the context information, when resending the read request, the host 100 does not need to re-enter a kernel to perform a memory access page fault processing procedure like address association. This saves CPU resources.

Optionally, a prefetcher (prefetching) may be further disposed in the CPU of the adapter card 200. The prefetcher may predict prefetched data to be accessed by an application, and then store the prefetched data into the cache. This improves access efficiency of the storage system. For example, it is assumed that the large page P1 is the prefetched data that is predicted by the prefetcher and that is to be accessed by the application. When all data in the cache is written into the second memory space 320 of the storage node 300 in the RDMA manner at a time, the large page P1 is reserved in the cache. In this way, when the application accesses the large page P1, the data may be directly read from the cache 230 of the adapter card 200. In a specific implementation, the prefetcher may be implemented by using dedicated hardware in the processor. The hardware monitors instructions or data that are/is requested in a program that is being executed, and identifies prefetched data required by a next program. Alternatively, the prefetcher may analyze code by using a compiler, and then insert a prefetch instruction in a program compilation process. In this way, in a program execution process, a prefetch action is performed at a location at which the prefetch instruction is inserted. It should be understood that the foregoing example is used for description, and a specific implementation of the prefetcher is not limited in this disclosure.

Optionally, cold page eviction logic may be further set in the CPU of the adapter card 200. If a page is not accessed by the host 100 for long time, the adapter card 200 may write the page into the storage node 300 in an RDMA manner, to save a cache space. Similarly, if a hot page is frequently accessed by the host 100, when an amount of data in the cache reaches a threshold and needs to be all written into the storage node 300 at a time, the hot page may be reserved in the cache. This improves a cache hit rate, and further improves data reading efficiency of the host 100.

In conclusion, in the storage system provided in this disclosure, the adapter card establishes a communication connection to the host through the bus, and establishes a communication connection to the storage node through the network. The adapter card may provide, for the host based on a size of the second memory space of the storage node, the first memory space that supports memory semantic access. When performing data persistence, the host may write data into the first memory space by using a memory semantic request. In response to the request, the adapter card persists the data to the second memory space of the storage node in the remote RDMA manner. In this way, the host does not need to perform protocol conversion when performing data persistence, to improve access efficiency of the storage system. In addition, the adapter card does not occupy a memory slot location of the host, and capacity scalability is higher. Further, when the host is faulty, the storage node may establish a communication connection to an adapter card on another host, and the data in the storage node may still be accessed by the other host, so that single-host reliability is improved.

Figure 5:
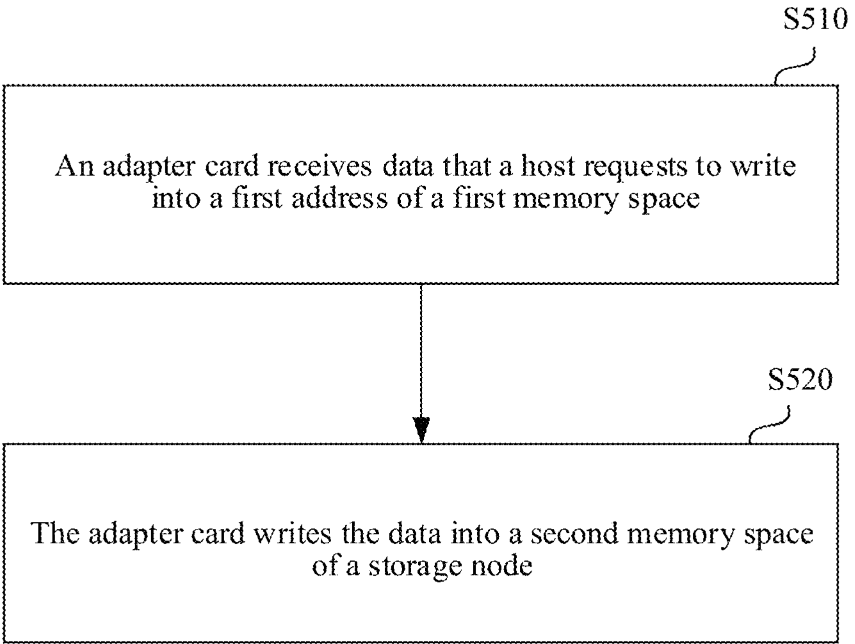
FIG. 5 is a schematic flowchart of steps of a storage method according to this disclosure.

FIG. 5 is a schematic flowchart of steps of a data storage method according to this disclosure. The method may be applied to the data storage system shown in FIG. 1 to FIG. 4. As shown in FIG. 5, the method may include the following steps.

Step S510: An adapter card receives data that a host requests to write into a first address of a first memory space, where the first memory space is a storage space that is provided by the adapter card for the host and that supports memory semantic access, and the first address is determined by the host based on a second correspondence and a first virtual memory address of an application.

In a specific implementation, the first memory space is the storage space that is provided by the adapter card for the host and that supports memory semantic access. The host may access the first memory space in a memory semantic manner. Compared with block-level, file-level, and object-level access manners, in the memory semantic manner, data does not need to be persisted from a memory to a hard disk. This avoids protocol overheads during data read/write, and improves data read/write efficiency.

In an embodiment, the application in the host may load and unload the first memory space in a memory mapping manner. Memory mapping means that a physical address space of the first memory space is mapped to a virtual memory space of a process of the application, so that the process of the application may read and modify the first memory space. This improves processing efficiency of the application. In a specific implementation, the first memory space may be loaded by using a memory mapping function mmap, and the first memory space may be unloaded by deleting a mapping relationship by using a munmap function. Alternatively, another manner is used. This is not limited in this disclosure.

After performing memory mapping, the host may obtain a second correspondence between an address of the first memory space and a virtual memory address of the application. The second correspondence may be stored by using a page table. When requesting to write data into the first memory space, the host may first determine, based on the first virtual memory address that needs to be accessed by the application and the second correspondence recorded in the page table, the first address corresponding to the first virtual memory address, and then send a write request for the first address to the adapter card.

In a specific implementation, the page table in the host includes a plurality of pages, there is a mapping relationship between virtual addresses of some pages and a segment of a physical address space of the first memory space, and there is a mapping relationship between virtual addresses of some pages and a segment of a physical address space of a local memory. In this way, the host can perform remote storage addressing, and an addressing manner is byte-level addressing. This avoids protocol conversion overheads. It should be understood that, the memory usually performs remote storage addressing in a page table manner. The first memory space and the local memory uniformly perform remote storage addressing by using the page table, so that a large change to the host can be avoided, and then deployment of the storage system provided in this disclosure is more convenient.

In a specific implementation, because a capacity of the first memory space provided by the adapter card for the host is usually far greater than a capacity of the local memory 130 of the host, when the host 100 performs memory mapping, a smaller page capacity of each page in the page table indicates a finer granularity of memory space division and higher maintenance overheads. In this case, the plurality of pages may include a large page and a small page. For example, a capacity of the large page is 2 MB, and a capacity of the small page is 4 kB. Certainly, the large page and the small page may be distinguished by using another numerical specification. This is not limited in this disclosure. When performing memory mapping, the host may perform mapping between a virtual address of a large page and the first address of the first memory space with a large storage capacity, and perform mapping between a virtual address of a small page and a physical address of the local memory with a small storage capacity, to obtain the first mapping relationship. Full mapping may be performed between the virtual address of the large page and the first address, so that no page fault exception occurs during process access. Full mapping may be performed between the virtual address of the small page and the address of the memory, or full mapping may not be performed between the virtual address of the small page and the address of the memory. This is not limited in this disclosure. If full mapping is not performed, a page fault exception may occur in the memory. However, this problem may be resolved by allocating a physical page of the memory. Details are not described herein.

It should be understood that the host uniformly manages the first memory space and the memory by using the page table. In this way, when accessing a large page 1 of the first memory space, the host may determine, based on the first mapping relationship, a first address 1 corresponding to the large page 1, and then send, to the adapter card, an access request carrying the first address 1. In this manner, efficient byte-level addressing of the host can be implemented, and the data can be directly written into a persistent memory. Compared with other persistent storage manners such as object storage, block storage, and file storage, in this storage manner, protocol conversion overheads required when the data is written from the memory into the hard disk are avoided, and data persistence efficiency is improved. For details, refer to the example descriptions in the embodiment in FIG. 3. Details are not described herein again.

Step S520: The adapter card writes the data into a second memory space of a storage node, where the adapter card includes a first correspondence between a physical address of the second memory space and an address of the first memory space.

In a specific implementation, the adapter card writes the data into a second address of the second memory space of the storage node in a remote RDMA manner, and updates the first correspondence, so that the first address in the first correspondence corresponds to the second address. It should be understood that the adapter card is communicatively connected to the storage node in the RDMA manner. If the storage node connected to the adapter card is faulty, the adapter card may establish an RDMA communication connection to another storage node, so that a service of the host is not affected. Similarly, if the host is faulty, the storage node may establish a communication connection to an adapter card on another host, and the other host takes over the data in the storage node. This ensures that data is not lost due to a host fault.

In an embodiment, the adapter card includes a cache, and the first correspondence includes a correspondence between the address of the first memory space and the cache, and the correspondence between the address of the first memory space and the physical address of the second memory space. When the adapter card receives a write request for the second address sent by the storage node, the adapter card may first write the data into a cache address in the cache, and update the first correspondence, so that the first address in the first correspondence corresponds to the cache address. Then, when the amount of data in the cache reaches a threshold, the adapter card writes the data into the second address of the second memory space of the storage node in the RDMA manner, and updates the first correspondence, where the first address in an updated first correspondence corresponds to the second address.

Optionally, the first correspondence may be stored into the adapter card by using an index. The index may be a page table of an MMU of the adapter card. The MMU is computer hardware responsible for a memory access request of a CPU. The page table of the MMU may record a set of mapping rules between addresses. In this embodiment of this disclosure, the page table of the MMU in the adapter card records the first correspondence.

In a specific implementation, when the data is written, the MMU of the adapter card may allocate a cache address to the to-be-written large page based on a remaining cache space of the adapter card, update the index, and record a mapping relationship between the first address of the to-be-written large page and the newly allocated cache address. In addition, after the amount of data in the cache reaches the threshold, the MMU may write all the data in the cache into the second memory space of the storage node in the RDMA manner at a time, update the index, and record a mapping relationship between the second address and the first address of the large page written into the second memory space. For details, refer to the descriptions about the cache and the index in the embodiment in FIG. 4. Details are not described herein again.

In an embodiment, optionally, when the adapter card receives the read request that is for the first address and that is sent by the host, the adapter card may determine, based on the first correspondence, an address corresponding to the first address. When the corresponding address is a cache address, the adapter card may process the read request for the first address based on the cache address, read the data from the cache address, and return the data to the host. This improves data reading efficiency of the host.

Optionally, when the address corresponding to the first address is the second address of the second memory space, the adapter card returns a cache miss message to the host, sends a read request for the second address to the storage node, receives the data returned by the storage node, stores the data into the cache, and updates the first correspondence. The first address in an updated first correspondence corresponds to the second address.

In an embodiment, the host includes a retry queue. The retry queue includes a missed data read request and context information of the missed data read request, and the retry queue is used by the host to resend the missed data read request to the adapter card based on the context information. The context information may record some specific information of the access request indicating the hit failure, such as what data needs to be read, where the data is obtained, and where the data needs to be returned after being obtained. The host may obtain the read request and the corresponding context information from the retry queue periodically or at a specific frequency to perform a retry. If a target page is hit, the read request is deleted from the retry queue; or if a target page is not hit, a next retry is waited until the target page is hit.

In a specific implementation, the cache miss message may be a hard interrupt request. After receiving the hard interrupt request, the host puts, into the retry queue, the read request indicating the hit failure, so that a related resource used to process the read request is released, and the related resource is used to process another service without waiting for long time for data return. This improves utilization of CPU resources. In addition, the host periodically executes each request in the retry queue, and resends, to the adapter card, the read request carrying the first address until the data is hit in the cache of the adapter card. It may be understood that, due to existence of the context information, when resending the read request, the host does not need to re-enter a kernel to perform a memory access page fault processing procedure like address association. This saves CPU resources.

Optionally, a prefetcher may be further disposed in the CPU of the adapter card. The prefetcher may predict prefetched data to be accessed by an application, and then store the prefetched data into the cache. This improves access efficiency of the storage system. For example, it is assumed that a large page P1 is the prefetched data that is predicted by the prefetcher and that is to be accessed by the application. When all data in the cache is written into the second memory space of the storage node in the RDMA manner at a time, the large page P1 is reserved in the cache. In this way, when the application accesses the large page P1, the data may be directly read from the cache of the adapter card. In a specific implementation, the prefetcher may be implemented by using dedicated hardware in the processor. The hardware monitors instructions or data that are/is requested in a program that is being executed, and identifies prefetched data required by a next program. Alternatively, the prefetcher may analyze code by using a compiler, and then insert a prefetch instruction in a program compilation process. In this way, in a program execution process, a prefetch action is performed at a location at which the prefetch instruction is inserted. It should be understood that the foregoing example is used for description, and a specific implementation of the prefetcher is not limited in this disclosure.

Optionally, cold page eviction logic may be further set in the CPU of the adapter card. If a page is not accessed by the host for long time, the adapter card may write the page into the storage node in an RDMA manner, to save a cache space. Similarly, if a hot page is frequently accessed by the host, when an amount of data in the cache reaches a threshold and needs to be all written into the storage node at a time, the hot page may be reserved in the cache. This improves a cache hit rate, and further improves data reading efficiency of the host.

In an embodiment, before step S510, the adapter card may perform a storage access configuration method provided in this disclosure. The method includes the following steps: providing, for the host, a storage space that supports memory semantic access, and then establishing a correspondence between the storage space and a physical address of a persistent storage device of the storage node. In other words, the adapter card provides the first memory space for the host, and then establishes the first correspondence between the address of first memory space and the physical address of the second memory space. After configuration succeeds, the adapter card may perform step S510 and step S520 to implement a data storage function provided in this disclosure.

In conclusion, in the storage method provided in this disclosure, the adapter card establishes a communication connection to the host through the bus, and establishes a communication connection to the storage node through the network. The adapter card may provide, for the host based on a size of the second memory space of the storage node, the first memory space that supports memory semantic access. When performing data persistence, the host may write data into the first memory space by using a memory semantic request. In response to the request, the adapter card persists the data to the second memory space of the storage node in the remote RDMA manner. In this way, the host does not need to perform protocol conversion when performing data persistence, to improve access efficiency of the storage system. In addition, the adapter card does not occupy a memory slot location of the host, and capacity scalability is higher. Further, when the host is faulty, the storage node may establish a communication connection to an adapter card on another host, and the data in the storage node may still be accessed by the other host, so that single-host reliability is improved.

Figure 6:
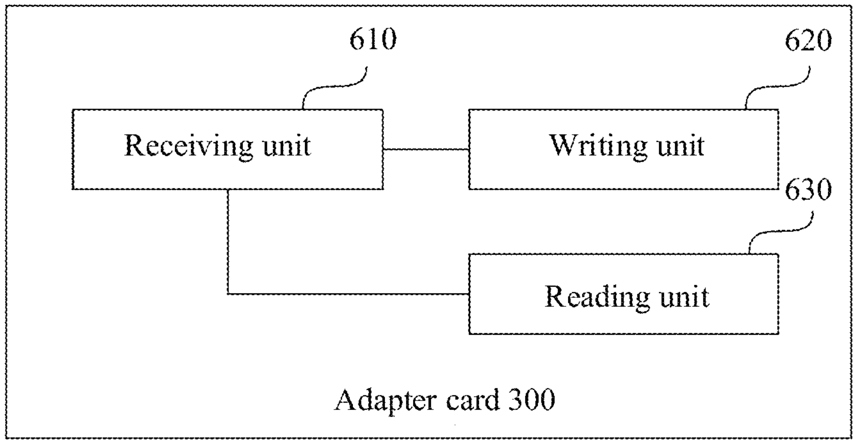
FIG. 6 is a diagram of a structure of an adapter card according to this disclosure.

FIG. 6 is a diagram of a structure of an adapter card according to this disclosure. The adapter card may be the adapter card 200 in FIG. 1 to FIG. 5. The adapter card 200 may include a receiving unit 610, a writing unit 620, and a reading unit 630.

The receiving unit 610 is configured to receive data that a host requests to write into a first address of a first memory space, where the first memory space is a storage space that is provided by the adapter card for the host and that supports memory semantic access.

The writing unit 620 is configured to write the data into a second memory space of a storage node, where the adapter card includes a first correspondence between a physical address of the second memory space and an address of the first memory space.

In an embodiment, the writing unit 620 is configured to write the data into a second address of the second memory space of the storage node in an RDMA manner, where the first address in the first correspondence corresponds to the second address.

In an embodiment, the adapter card includes a cache, and the first correspondence includes a correspondence between the address of the first memory space and the cache, and the correspondence between the address of the first memory space and the physical address of the second memory space.

In an embodiment, the writing unit 620 is configured to: write the data into a cache address in the cache, and update the first correspondence, so that the first address in the first correspondence corresponds to the cache address. The writing unit 620 is configured to: when the amount of data in the cache reaches a threshold, write the data into the second address of the second memory space of the storage node in the RDMA manner, and update the first correspondence, so that the first address corresponds to the second address.

In an embodiment, the adapter card 200 includes the reading unit 630. The receiving unit 610 is configured to receive a read request that is for the first address and that is sent by the host; the reading unit 630 is configured to determine, based on the first correspondence, an address corresponding to the first address; and the reading unit 630 is configured to: when the address corresponding to the first address is the cache address, process the read request for the first address based on the cache address.

In an embodiment, the reading unit 630 is configured to: when the address corresponding to the first address is the second address of the second memory space, return a cache miss message to the host; the reading unit 630 is configured to send a read request for the second address to the storage node; and the receiving unit 610 is configured to: receive the data sent by the storage node, store the data into the cache, and update the first correspondence.

In an embodiment, the second memory space is an NVDIMM. A bus includes one or more of a PCI bus, a CXL bus, and a GenZ bus.

In an embodiment, the adapter card 200 may further include a configuration unit. The configuration unit is configured to: implement the storage access configuration method in the foregoing content, that is, provide, for the host, a storage space that supports memory semantic access, and establish a correspondence between the storage space and a physical address of a persistent storage device of the storage node. In other words, the adapter card provides the first memory space for the host, and then establishes the first correspondence between the first memory space and the physical address of the second memory space. It should be understood that FIG. 6 is an example division of the adapter card 200 provided in this disclosure. In a specific implementation, the adapter card 200 provided in this disclosure may alternatively include more or fewer unit modules. This is not limited in this disclosure.

In conclusion, the adapter card provided in this disclosure establishes a communication connection to the host through the bus, and establishes a communication connection to the storage node through the network. The adapter card may provide, for the host based on a size of the second memory space of the storage node, the first memory space that supports memory semantic access. When performing data persistence, the host may write data into the first memory space by using a memory semantic request. In response to the request, the adapter card persists the data to the second memory space of the storage node in the remote RDMA manner. In this way, the host does not need to perform protocol conversion when performing data persistence, to improve access efficiency of the storage system. In addition, the adapter card does not occupy a memory slot location of the host, and capacity scalability is higher. Further, when the host is faulty, the storage node may establish a communication connection to an adapter card on another host, and the data in the storage node may still be accessed by the other host, so that single-host reliability is improved.

Figure 7:
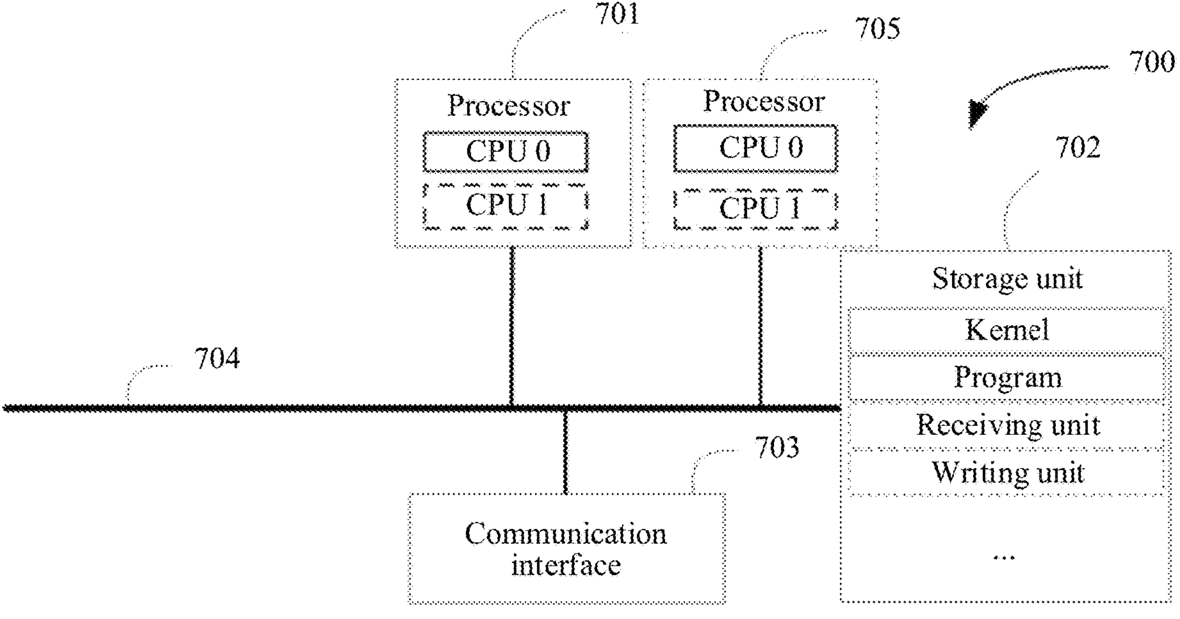
FIG. 7 is a diagram of a structure of a computing device according to this disclosure.

FIG. 7 is a diagram of a structure of a computing device according to this disclosure. The computing device 700 is the adapter card 200 in the embodiments in FIG. 1 to FIG. 6.

Further, the computing device 700 includes a processor 701, a storage unit 702, and a communication interface 703. The processor 701, the storage unit 702, and the communication interface 703 communicate with each other through a bus 704, or communicate with each other by using another means like wireless transmission.

The processor 701 may include at least one general-purpose processor, for example, a CPU, an NPU, or a combination of a CPU and a hardware chip. The hardware chip is an ASIC, a PLD, or a combination thereof. The PLD is a CPLD, an FPGA, a GAL, or any combination thereof. The processor 701 executes various types of digital storage instructions, for example, a software or firmware program stored into the storage unit 702, so that the computing device 700 can provide a wide range of diverse services.

In a specific implementation, in an embodiment, the processor 701 includes one or more CPUs, for example, a CPU 0 and a CPU 1 that are shown in FIG. 7.

In a specific implementation, in an embodiment, the computing device 700 also includes a plurality of processors, for example, the processor 701 and a processor 705 that are shown in FIG. 7. Each of the processors may be a single-core processor (single-CPU) or a multi-core processor (multi-CPU). The processor herein means one or more devices, circuits, and/or processing cores configured to process data (for example, computer program instructions).

The storage unit 702 is configured to store code, and the processor 701 controls execution, to perform processing steps of the adapter card in any one of the embodiments in FIG. 1 to FIG. 6. The code includes one or more software units. The one or more software units are the receiving unit and the writing unit in the embodiment in FIG. 6. The receiving unit is configured to receive data that the host requests to write into a first address of a first memory space, and the writing unit is configured to write the data into a second address of a second memory space of a storage node. The processor 701 may be configured to perform the data storage method and the storage access configuration method that are described in the embodiment in FIG. 5. Details are not described herein again.

The storage unit 702 includes a read-only memory (ROM) and a RAM, and provides instructions and data for the processor 701. The storage unit 702 further includes a non-volatile RAM. For example, the storage unit 702 further stores information about a device type.

The storage unit 702 is a volatile memory or a non-volatile memory, or includes both a volatile memory and a non-volatile memory. The non-volatile memory is a ROM, a programmable read-only memory (programmable ROM or PROM), an erasable programmable read-only memory (erasable PROM or EPROM), an electrically erasable programmable read-only memory (electrically EPROM or EEPROM), or a flash memory. The volatile memory is a RAM, and serves as an external cache. Through an example but not a limitative description, many forms of RAMs may be used, for example, an SRAM, a DRAM, an SDRAM, a double data rate synchronous dynamic random-access memory (double data rate SDRAM or DDR SDRAM), an enhanced synchronous dynamic random-access memory (enhanced SDRAM or ESDRAM), a synchlink dynamic random-access memory (synchlink DRAM or SLDRAM), and a direct Rambus random-access memory (direct Rambus RAM or DR RAM), or a hard disk, a Universal Serial Bus (USB) flash drive, a flash memory (flash), a Secure Digital (SD) card, a memory stick, or the like. The hard disk is a hard disk drive (HDD), a solid-state drive (SSD), a mechanical hard disk, or the like. This is not limited in this disclosure.

The communication interface 703 is a wired interface (for example, an Ethernet interface), an internal interface (for example, a high-speed serial computer extension bus (PCIe) bus interface), a wired interface (for example, an Ethernet interface), or a wireless interface (for example, a cellular network interface or a wireless local area network interface), and is configured to communicate with another server or unit. In a specific implementation, the communication interface 703 is configured to receive a packet, so that the processor 701 or the processor 705 processes the packet.

The bus 704 is a PCIe bus, an Extended Industry Standard Architecture (EISA) a UB, a CXL bus, a CCIX bus, or the like. The bus 704 is classified into an address bus, a data bus, a control bus, and the like.

In addition to the data bus, the bus 704 further includes a power bus, a control bus, a status signal bus, and the like. However, for clear description, various types of buses in the figure are marked as the bus 704.

It should be noted that FIG. 7 is merely a possible implementation of this embodiment of this disclosure. In actual application, the computing device 700 further includes more or fewer components. This is not limited herein. For content that is not shown or not described in this embodiment of this disclosure, refer to related descriptions of the adapter card in the embodiments in FIG. 1 to FIG. 6. Details are not described herein again.

An embodiment of this disclosure provides a computer-readable storage medium. The computer computer-readable storage medium stores computer instructions. When the computer instructions are run on a computer, the computer is enabled to perform the data storage method in the foregoing method embodiment.

An embodiment of this disclosure provides a computer program product including instructions. The computer program product includes a computer program or the instructions. When the computer program or the instructions is/are run on a computer, the computer is enabled to perform the data storage method in the foregoing method embodiment.

An embodiment of this disclosure provides a chip. The chip may be used in a server in which a processor of an X86 architecture is located (which may also be referred to as an X86 server), a server in which a processor of an ARM architecture is located (which may also be referred to as an ARM server for short), or the like. The chip may include an integrated circuit and/or a component. When the chip runs on the server, the server is enabled to perform the data storage method and the storage access configuration method in the foregoing method embodiment.

An embodiment of this disclosure provides a mainboard, which may also be referred to as a PCB. The mainboard includes a processor, and the processor is configured to execute program code to implement the data storage method and the storage access configuration method in the foregoing method embodiment. Optionally, the mainboard may further include a memory. The memory is configured to store the program code for execution by the processor.

All or some of the foregoing embodiments may be implemented by using software, hardware, firmware, or any combination thereof. When software is used to implement embodiments, all or some of the foregoing embodiments may be implemented in a form of a computer program product. The computer program product includes at least one computer instruction. When the computer program instruction is loaded and executed on a computer, procedure or functions according to embodiments of the present disclosure are all or partially generated. The computer may be a general-purpose computer, a dedicated computer, a computer network, or another programmable apparatus. The computer instructions may be stored into a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage node, like a server or a data center, including at least one usable medium set. The usable medium may be a magnetic medium (for example, a floppy disk, a hard disk, or a magnetic tape), an optical medium (for example, a high-density digital video disc (DVD)), or a semiconductor medium. The semiconductor medium may be an SSD.

The foregoing descriptions are merely specific implementations of the present disclosure, but are not intended to limit the protection scope of the present disclosure. Various equivalent modifications or replacements may be readily figured out by a person skilled in the art within the technical scope disclosed in the present disclosure, and all these modifications or replacements shall fall within the protection scope of the present disclosure. Therefore, the protection scope of the present disclosure shall be subject to the protection scope of the claims.

What is claimed is:

1. A system, comprising:

a host configured to:

establish, through a bus, a first communication connection; and send, through the first communication connection and using memory semantic operations, first data that the host requests to write into a first address of a first memory space, wherein the first memory space supports memory semantic access, and wherein the memory semantic operations comprise byte-level addressing operations to access the first memory space using load and store operations directed to byte-addressable physical addresses;

a storage node comprising a second memory space and configured to establish, through a network, a second communication connection; and an adapter card configured to:

provide the first memory space for the host, wherein the first memory space is mapped from a capacity of the second memory space of the storage node and is configured to support memory semantic access operations from the host;

receive, through the first communication connection and from the host, the first data, wherein the first data is received as the memory semantic operations comprising the byte-level addressing operations;

write, through the second communication connection, the first data into the second memory space by converting the memory semantic access operations received from the host to remote direct memory access (RDMA) network protocol operations for transmitting the first data to the storage node; and store a first correspondence between a physical address of the second memory space and the first address, wherein the first correspondence maps byte-level addresses from the memory semantic access operations to physical addresses of the second memory space.

2. The system of claim 1, wherein the host comprises a second correspondence between the first address and a virtual memory address of an application.

3. The system of claim 2, wherein the adapter card is further configured to write, into a second address of the second memory space and in an RDMA manner, the first data by converting the memory semantic operations to RDMA network protocol operations, and wherein the first address in the first correspondence corresponds to the second address.

4. The system of claim 3, wherein the adapter card further comprises a cache, wherein the first correspondence further comprises a third correspondence between the first address and the cache, and wherein the adapter card stores data received as byte-level addressing operations from the host into the cache.

5. The system of claim 4, wherein the adapter card is further configured to:

write, into a cache address of the cache, the first data;

update the first address in the first correspondence to correspond to the cache address;

write, in the RDMA manner, the first data into the second address of the second memory space when an amount of second data in the cache reaches a threshold; and update the first address in the first correspondence to correspond to the second address.

6. The system of claim 5, wherein the host is further configured to send, to the adapter card, a first read request for the first address, and wherein the adapter card is further configured to process, based on the cache address, the first read request when a third address corresponding to the first address is the cache address.

7. The system of claim 6, wherein when the third address is the second address, the adapter card is further configured to:

return, to the host, a cache miss message;

send, to the storage node, a second read request for the second address;

receive, in response to the second read request and from the storage node, the first data;

store, into the cache, the first data; and update the first correspondence.

8. The system of claim 7, wherein the host further comprises a retry queue comprising a missed data read request and context information of the missed data read request, and wherein the host is further configured to use the retry queue to resend, based on the context information and to the adapter card, the missed data read request.

9. The system of claim 1, wherein the second memory space is a non-volatile dual in-line memory module (NVDIMM).

10. The system of claim 1, wherein the bus comprises a Peripheral Component Interconnect Express (PCIe) bus.

11. The system of claim 1, wherein the adapter card further comprises a cache, and wherein the adapter card is further configured to:

write the first data into a cache address of the cache;

update the first correspondence to map the first address to the cache address;

write the first data into a second address of the second memory space using the RDMA network protocol operations when an amount of data in the cache reaches a threshold; and update the first correspondence to map the first address to the second address.

12. An adapter card, comprising:

a memory configured to store instructions; and one or more processors coupled to the memory and configured to execute the instructions to:

establish, through a bus, a first communication connection with a host;

provide, for the host, first memory space that supports memory semantic access, wherein the first memory space is mapped from a capacity of a second memory space of a storage node and is configured to support memory semantic access operations from the host;

receive, through the first communication connection and from the host, first data that the host requests to write into a first address of the first memory space, wherein the first data is received as memory semantic operations comprising byte-level addressing operations;

establish, through a network, a second communication connection with the storage node;

write, through the second communication connection and into the second memory space of the storage node, the first data by converting the memory semantic access operations received from the host to remote direct memory access (RDMA) network protocol operations for transmitting the first data to the storage node; and store a first correspondence between a physical address of the second memory space and the first address, wherein the first correspondence maps byte-level addresses from the memory semantic access operations to physical addresses of the second memory space.

13. The adapter card of claim 12, wherein the one or more processors are further configured to execute the instructions to write, into a second address of the second memory space and in an RDMA manner, the first data by converting the memory semantic operations to RMDA network protocol operations, and wherein the first address in the first correspondence corresponds to the second address.

14. The adapter card of claim 13, wherein the adapter card further comprises a cache, wherein the first correspondence further comprises a third correspondence between the first address and the cache, and wherein the adapter card stores data received as byte-level addressing operations from the host into the cache.

15. The adapter card of claim 14, wherein the one or more processors are further configured to execute the instructions to:

write, into a cache address of the cache, the first data;

update the first address in the first correspondence to correspond to the cache address;

write, in the RDMA manner, the first data into the second address of the second memory space when an amount of second data in the cache reaches a threshold; and update the first address in the first correspondence to correspond to the second address.

16. The adapter card of claim 15, wherein the one or more processors are further configured to execute the instructions to:

receive, from the host, a first read request for the first address; and process, based on the cache address, the first read request when a third address corresponding to the first address is the cache address.

17. The adapter card of claim 16, wherein when the third address is the second address, the one or more processors are further configured to execute the instructions to:

return, to the host, a cache miss message;

send, to the storage node, a second read request for the second address;

receive, in response to the second read request and from the storage node, the first data;

store, into the cache, the first data; and update the first correspondence.

18. The adapter card of claim 12, wherein the second memory space is a non-volatile dual in-line memory module (NVDIMM).

19. The adapter card of claim 12, wherein the bus comprises one or more of a Compute Express Link (CXL) bus or a generation Z (GenZ) bus.

20. A method, comprising:

establishing, through a bus, a first communication connection with a host;

providing, for the host, a first memory space that supports memory semantic access, wherein the first memory space is mapped from a capacity of a second memory space of a storage node and is configured to support memory semantic access operations from the host;

receiving, through the first communication connection and from the host, first data that the host requests to write into a first address of the first memory space, wherein the first data is received as memory semantic operations comprising byte-level addressing operations;

establishing, through a network, a second communication connection with the storage node;

writing, through the second communication connection and into the second memory space of the storage node, the first data by converting the memory semantic access operations received from the host to remote direct memory access (RDMA) network protocol operations for transmitting the first data to the storage node; and storing a first correspondence between a physical address of the second memory space and the first address, wherein the first correspondence maps byte-level addresses from the memory semantic access operations to physical addresses of the second memory space.

* * * * *